(12) United States Patent
Zeibig et al.

(10) Patent No.: US 6,983,534 B2
(45) Date of Patent: Jan. 10, 2006

(54) METHOD FOR PARTIALLY EXPOSING CONDUCTIVE STRIPS OF FLAT LAMINATED CABLE

(75) Inventors: Dietmar Zeibig, Dresden (DE); Leo Bühler, Wadenswil (CH)

(73) Assignee: Schleuniger Holding AG, Thun (CH)

( * ) Notice: Subject to any disclaimer, the term of this patent is extended or adjusted under 35 U.S.C. 154(b) by 307 days.

(21) Appl. No.: 10/274,836

(22) Filed: Oct. 18, 2002

(65) Prior Publication Data

US 2004/0074090 A1 Apr. 22, 2004

(51) Int. Cl.
*H01R 43/00* (2006.01)

(52) U.S. Cl. .............. 29/825; 29/867; 81/9.51

(58) Field of Classification Search .......... 29/825, 29/867, 887; 81/9.51

See application file for complete search history.

(56) References Cited

U.S. PATENT DOCUMENTS

| | | | | |
|---|---|---|---|---|
| 3,261,239 A | * | 7/1966 | Moons et al. ............. | 81/9.51 |
| 3,385,140 A | * | 5/1968 | Carpenter et al. ......... | 81/9.51 |
| 3,909,911 A | * | 10/1975 | Smith et al. ............. | 29/867 |
| 4,106,377 A | * | 8/1978 | Owen et al. ............. | 83/874 |
| 4,120,217 A | * | 10/1978 | Rodd et al. ............. | 81/9.51 |
| 4,470,195 A | * | 9/1984 | Lang ..................... | 29/825 |
| 4,662,968 A | * | 5/1987 | Bleuel et al. ............ | 156/250 |

FOREIGN PATENT DOCUMENTS

| | | |
|---|---|---|
| DE | 1 943 374 | 8/1969 |
| DE | 27 23 851 | 5/1977 |
| DE | 35 01 839 | 1/1985 |
| DE | 89 08 274 | 5/1991 |
| WO | WO98/20590 | 5/1998 |

* cited by examiner

*Primary Examiner*—Carl J. Arbes
(74) *Attorney, Agent, or Firm*—Davis & Bujold, P.L.L.C.

(57) ABSTRACT

The invention relates to a continuous process and an apparatus for partially exposing conductor tracks in fully insulated laminated cables according to specifiable parameters selectable in accordance with the subsequent conditions for use. The object of the invention is to insert windows in exactly predetermined parts above/below individual/all flat conductors of a multiconductor flat cable, which windows are distinguished by clean and accurate contours and furthermore ensure good positional stability of the conductors. The flat cable (1) is first fed to an apparatus and fixed on it in such a way that an individually feedable and individually movable peeling tool (5) can be coordinated in a defined manner with each flat conductor, both from above and from below, which peeling tool effects first an incision in the insulation layer, then peeling off down to the flat conductor and finally separation of the chip (10).

26 Claims, 3 Drawing Sheets

METHOD FOR PARTIALLY EXPOSING CONDUCTIVE STRIPS OF FLAT LAMINATED CABLE

FIELD OF THE INVENTION

The invention relates to a continuous process and an apparatus for partially exposing the conductor strips of laminated cables completely insulated in the longitudinal direction, in accordance with specifiable parameters determined according to the subsequent conditions of use.

In the production of flexible laminated cables by adhesively bonding an upper laminate web, cut to corresponding lengths of previously determined parts, it is customary to leave slots over the exposed conductors. However, this considerably impairs the effectiveness of the known cost-saving production processes for flat cables. Furthermore, the precision required in the positioning of the windows and the positional stability of the flat conductors during the use of this process, which stability still has to be maintained, cannot be guaranteed so that complicated finishing operations are often required.

DE-GBM 89 08 274 discloses the adhesive bonding of an upper/lower laminate web, which was provided beforehand with appropriately positioned windows, to the still exposed flat conductors in the course of the production process, the disadvantages as described above likewise occurring.

German Patent 35 01 839 describes the use of a pulsed laser beam with ultraviolet emission for stripping conductors by means of which the laser beam vaporizes the insulation layer over the conductor in the intended parts without contact. Apart from the fact that here too complete and residue-free exposing of specific conductor segments cannot be reliably achieved, this process requires additional outlays for the extraction of the liberated plastic vapors which are harmful to health. In addition, the remaining combustion residues may prevent a reliable electrical connection of the exposed segments to other conductors. These deficiencies are also to be expected in the laser beam process described in WO 98/20590. Furthermore, it is known (e.g. DE 27 23 851) that the ends of laminated cables can be stripped with the aid of an electrically heatable knife, with the result that only windows which extend over the total cable width could be introduced into continuously moving material.

DE 19 43 374 discloses an arrangement for the complete or partial stripping of individual parts of laminated cables. This is effected using at least one laser whose beam is to be guided with such an energy and at such an angle to that part of the cable which is to be stripped that the desired amount of the insulation material is removed without the conductors being damaged. However, practical experience has shown that sufficiently accurate stripping which removes the insulation material without a residue, in particular in a dust-free manner, is not always achieved.

SUMMARY OF THE INVENTION

It is therefore the object of the invention to develop a process and an apparatus for producing windows in exactly predetermined parts above/below individual/all flat conductors of a multiconductor laminated cable, which windows are distinguished by clean and accurate contours and furthermore ensure good positional stability of the conductors. Finishing operations are to be substantially avoided.

The process according to the invention is described with its variants in the independent process claims and the associated apparatuses are described with their variants in the independent product claims. The dependent claims relate to advantageous embodiments of the process and of the apparatus or to variants thereof.

In one embodiment, the flat cable produced in a known manner is first fixed by means of the apparatus according to the invention in such a way that an individually feedable and individually movable peeling tool can be assigned to each conductor track both from above and from below. In a first operation, an incision is made in the upper and/or lower insulation layer at the beginning of the previously determined window opening(s) by setting down the peeling tool or tools required in each case. By subsequent slight raising of the peeling tool or tools required by a part of the thickness of the insulation layer and subsequent defined movement of the peeling tools along the flat cable, the insulation layer present above/below the conductor tracks is peeled off in accordance with the respective predetermined window length (working stroke). The window width is exactly reached by one cutting contour each at both ends of the cutting tool or tools. Thereafter, the peeling tools are raised, the cable attachment is released and the chips formed during peeling are separated off without dust production (empty stroke).

In one embodiment, the apparatus according to the invention consists of a table, a feed device for the laminated cable, a support with the peeling tools, an alignment and fixing unit and a chip breaker and of an electronic control unit with a measuring and central processing unit. According to the invention, a peeling tool is coordinated with each conductor track in the laminated cable from above and/or below.

The peeling tools are wedge-shaped in such a way that their end faces tapering to a small angle form a sharp cutting edge for cutting into and subsequently peeling off the windows.

The control unit serves for constant evaluation of the process results and correction thereof and the input and storage of process parameters for further variants of the production of windows and the reproducibility of the production sequence.

Since the cable always has tolerances, it is advantageous if stored or—preferably automatically—measured correction values are implemented manually or automatically with the axes present.

BRIEF DESCRIPTION OF THE DRAWINGS

The invention is to be explained in more detail below with reference to an embodiment. In the attached drawings.

DETAILED DESCRIPTION OF THE INVENTION

Figure 1:
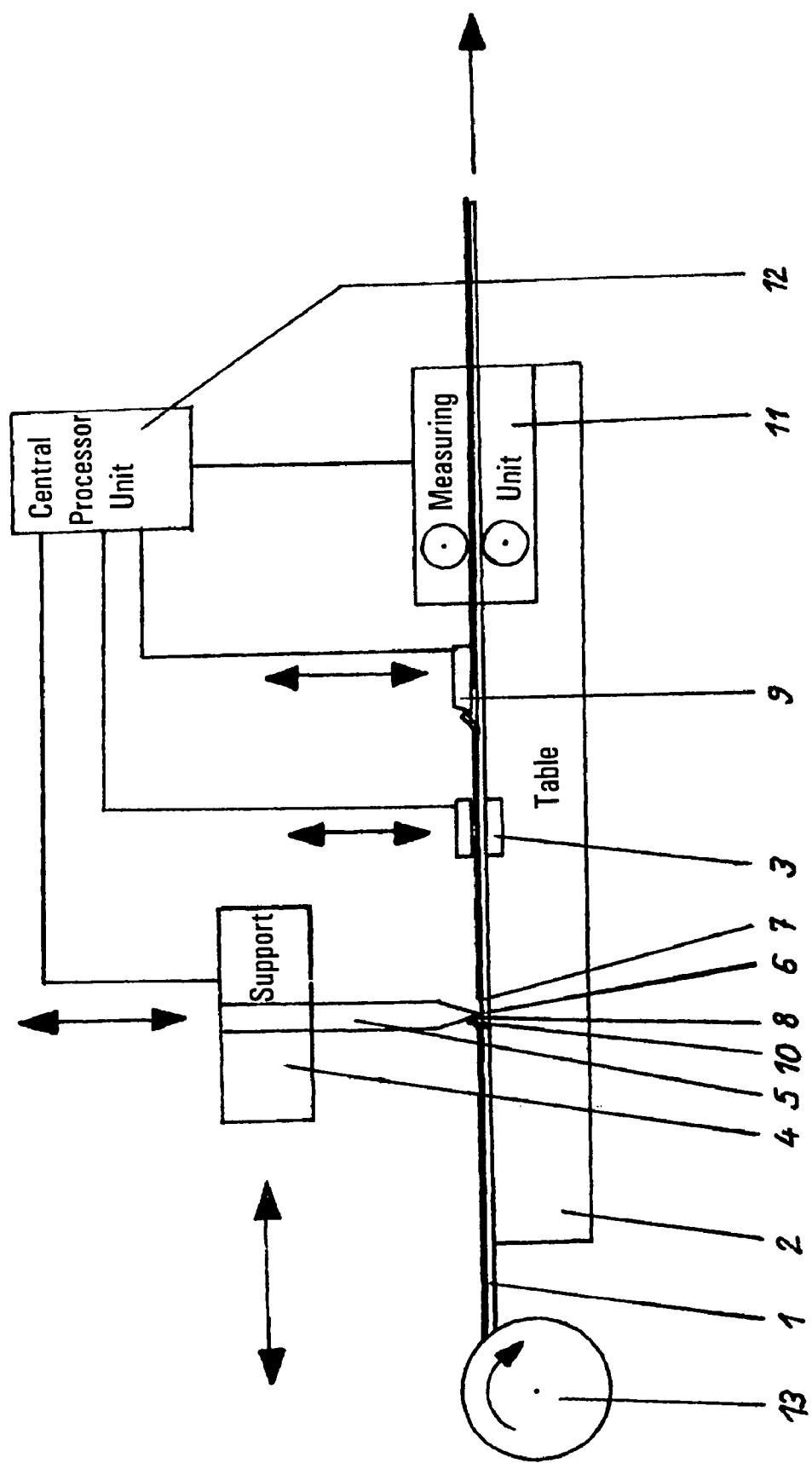
FIG. 1 shows a block diagram of the process according to the invention.
Figure 2:
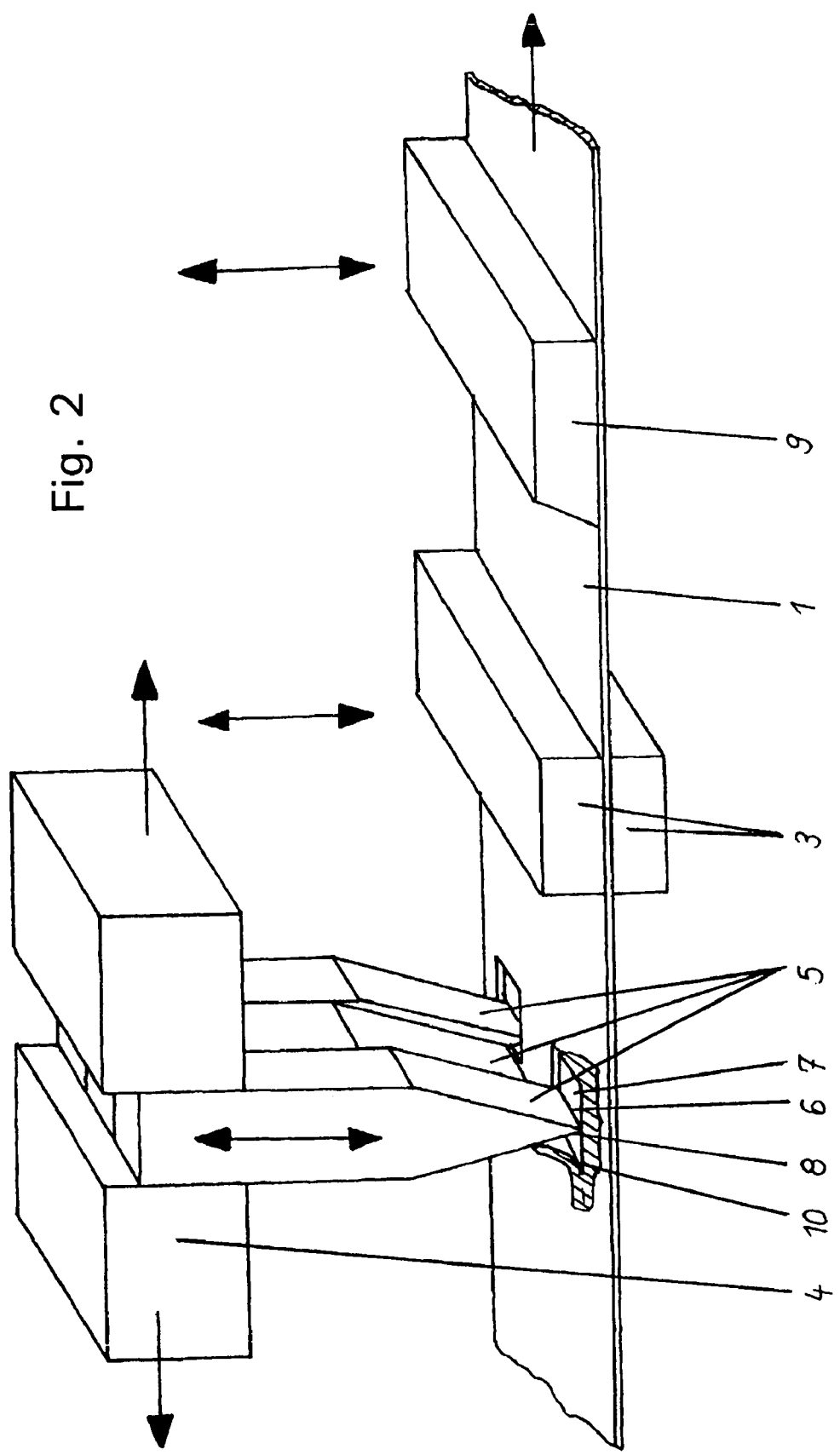
FIG. 2 shows the structure of an associated apparatus comprising tools arranged above the work table and FIG. 3 shows an embodiment having pivotable peeling tools.

The laminated cable 1 is guided over the table 2 and aligned by means of the associated alignment and fixing unit 3 accurately in terms of position and distance with respect to the start of the cable and the tools. The wedge-shaped peeling tools 5 are arranged on the support 4 above the table 2, side by side and transverse to the flat cable 1. Their end faces tapering to a small angle each forming a sharp cutting edge 6 for cutting into the insulation layer and for subsequently peeling it off. Clean lateral cut edges of the windows 7 produced in the longitudinal direction of the flat cable 1 are achieved by additional sharp contours 8 at the triangular side faces of the peeling tools 5. All peeling tools 5 are longitudinally movable together with the support 4 and are arranged to be individually height-adjustable independently of one another in the support 4, so that they can be set up for cutting the windows 7 as defined beforehand in position and dimension into the insulation layer of the cable 1 and for peeling off the relevant insulation layer zones before the beginning of work. Behind the tool support 4, the alignment and fixing unit 3 and the chip breaker 9 are arranged in a height-adjustable manner on the work table 2. The apparatus is controlled by a measuring unit 11 and a central processor unit 12, which are electrically connected to the support 4, the alignment and fixing unit 3 and the chip breaker 9. Longitudinal segments of the laminated cable 1 passing through are detected by the measuring unit 11 and communicated to the central processor unit 12. After a preselected distance to the respective preceding window 7 or to the start of the flat cable has been reached, the central processor unit 12 transmits signals for alignment and fixing of the cable 1 to the executing apparatus. The peeling tool or tools 5 is or are lowered and the insulation layer is cut into above the conductor tracks of the flat cable 1. Thereafter, the respective peeling tool 5 is raised by a minimum amount and the support 4 with the wedge-shaped peeling tools 5 are moved in the direction of the longitudinal axis of the cable 1 by the length of the intended window 7 (working stroke). The insulation layer is peeled off above the conductor tracks and remains hanging on the insulation layer as chip 10 at the end of the window 7. After the peeling tools 5 return to their starting position (empty stroke), the laminated cable 1 is transported onwards in the opposite direction through the fixing unit until window 7 is present below the chip breaker 9, where the chip 10 is separated off and is removed by extraction. This is followed by the working stroke for the next window 7.

The windows can also be introduced in a continuous process for the production of the laminated cable. In this case, a flat cable buffer forms during the "peeling" operation before the support 4 of the peeling tool or tools 5. The division of the endless cable 1 into lengths for use is then carried out behind the apparatus. If lengths already cut to size are to be provided with windows, the fixing of the defined starting position can likewise be carried out in the apparatus according to the invention by means of the fixing unit after the appropriate program has been saved in the central processor unit 12.

Figure 3:
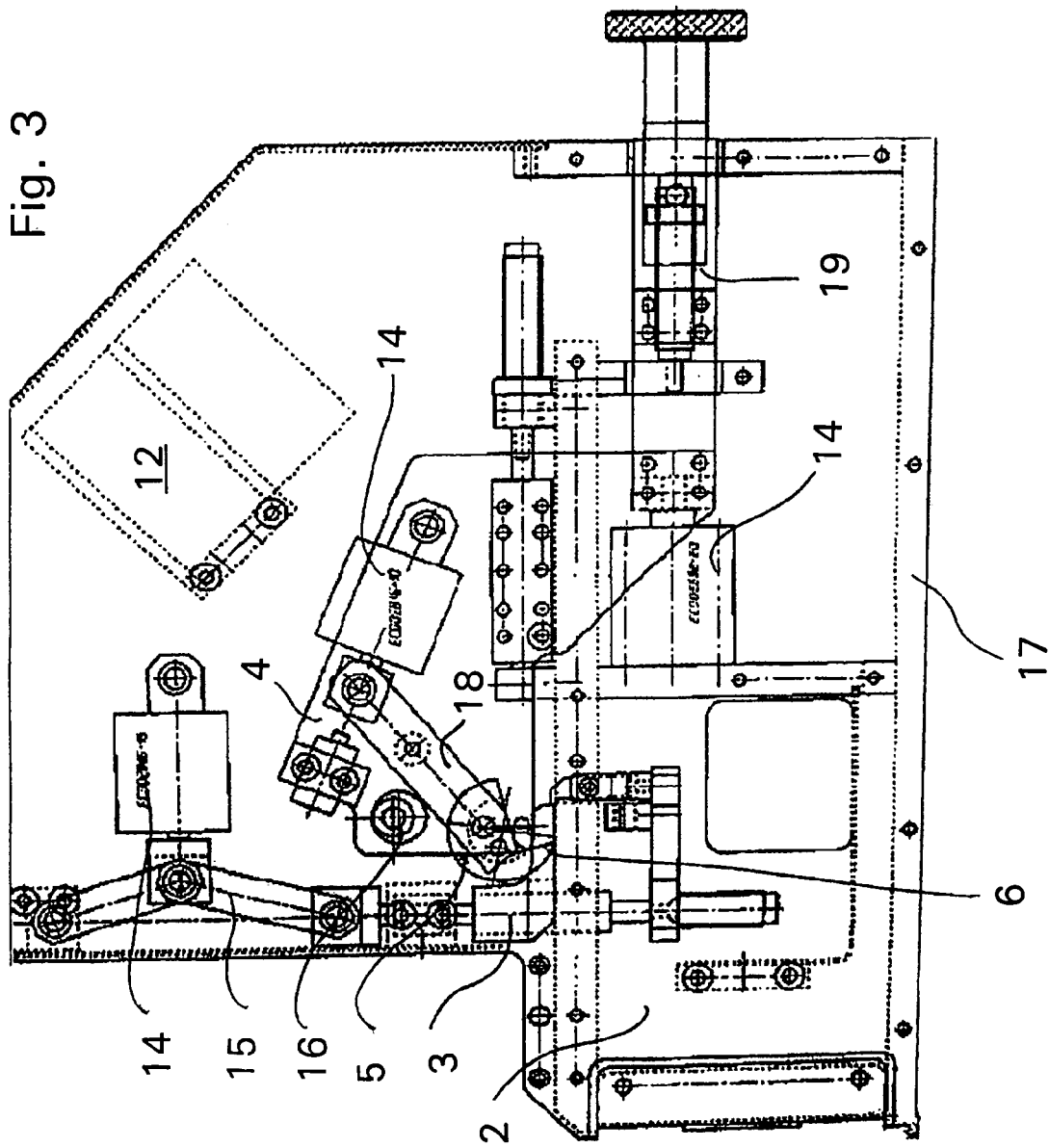

The version according to FIG. 3 shows a further embodiment in which the peeling tool 5 is pivotably mounted on the support 4 by means of a two-arm lever 18 which is operated by a drive 14. The entire support 14 can be adjusted in its height relative to the work table 2 by means of an adjusting cam 16. An alignment and fixing unit can be operated by means of toggle lever 15, likewise by a drive 14. A frame supports the entire apparatus. Said apparatus can also be arranged between drive belts or drive rollers so that the belt feed can take place automatically. For the displacement of the work table relative to the peeling tools, a drive 14 which is adjustable in position by means of adjusting screw 19 is also provided at the side of the work table 2.

By means of the described continuous process according to the invention and the associated apparatus, electrically conducting windows can be introduced in exactly predetermined parts above and/or below individual or all conductor tracks of a multiconductor laminated cables which windows are distinguished by clean and accurate contours and nevertheless ensure good positional stability of the individual conductors. Subsequent finishing operations, for example during the mounting of cables, are very substantially avoided.

Variants of the processes described are mentioned in the ancillary independent claims and in the subclaims.

LIST OF REFERENCE NUMERALS USED

1 Laminated cable
2 Table
3 Alignment and fixing unit
4 Support
5 Peeling tools
6 Cutting edge of the peeling tool
7 Window in the laminated cable
8 Contours at the end of the peeling tool
9 Chip breaker
10 Chip
11 Measuring unit
12 Central processor unit
13 Feed device
14 Drives
15 Toggle lever
16 Eccentric height adjustment
17 Frame

What is claimed is:

1. A process for partially exposing conductor tracks of a multiconductor insulated laminated cable by forming at least one window of a desired length into at least one of an upper and lower insulation layer of the laminated cable (1), the process comprising the steps:
   (a) introducing the laminated cable (1) into an apparatus having at least one individually feedable and movable peeling tool (5);
   (b) fixing of the laminated cable (1) to the apparatus so that the at least one peeling tool (5) can be coordinated with at least one conductor track at least from one of above and below in accordance with a specified window;
   (c) cutting into at least one of the upper and lower insulation layer by relative penetrating movement between the peeling tool (5) and the insulation of the laminated cable (1);
   (d) slight moving the at least one peeling tool (5) away from the conductor track and then peeling off at least one of the upper and the lower insulation layer down to the conductor track by movement of the laminated cable (1) relative to the at least one peeling tool (5) such that peeling of the insulation of the laminated cable (1) is achieved solely by a cutting action of at least one cutting edge of the at least one peeling tool (5); and
   (e) separating of a chip (10) formed during peeling the laminated cable (1).

2. A process for partially exposing conductor tracks of a multiconductor insulated laminated cable by forming at least one window of a desired length into at least one of an upper and lower insulation layer of the laminated cable (1), the process comprising the steps:
   (a) introducing the laminated cable (1) into an apparatus having at least two individually feedable and movable peeling tools (5);
   (b) fixing of the laminated cable (1) to the apparatus so that at least one of the at least two peeling tools (5) can be coordinated with at least each conductor track to be processed, from one of above and below, in accordance with a specified window;

(c) cutting into at least one of the upper and lower insulation layer by relative penetrating movement between the at least two peeling tools (5) and the insulation of the laminated cable (1);

(d) slight moving the at least one peeling tool (5) away from the conductor track and then peeling off at least one of the upper and the lower insulation layer down to the conductor track by movement of the laminated cable (1) relative to the at least two peeling tools (5) such that peeling of the insulation of the laminated cable (1) is achieved solely by a cutting action of at least one cutting edge of at least one of the at least two peeling tools (5); and (e) separating of a chip (10) formed during peeling the laminated cable (1).

3. A process for partially exposing conductor tracks of a multiconductor insulated laminated cable by forming at least one window of a desired length into at least one of an upper and lower insulation layer of the laminated cable (1), the process comprising the steps:

(a) introducing the laminated cable (1) into an apparatus having a plurality of individually feedable and movable peeling tools (5);

(b) fixing of the laminated cable (1) to the apparatus so that one of the plurality of peeling tools (5) can be coordinated with at least each conductor track both from one of above and from below, in accordance with a specified window;

(c) cutting into at least one of the upper and lower insulation layer by relative penetrating movement between at least one of the plurality of peeling tools (5) and the insulation of the laminated cable (1);

(d) slight moving the at least one peeling tool (5) away from the conductor track and then peeling off at least one of the upper and the lower insulation layer down to the conductor track by movement of the laminated cable (1) relative to the plurality of peeling tools (5) such that peeling of the insulation of the laminated cable (1) is achieved solely by a cutting action of at least one cutting edge of at least one of the plurality of peeling tools (5); and (e) separating of a chip (10) formed during peeling the laminated cable (1).

4. The process as claimed in claim 1, further comprising the step of (f) cutting the laminated cable (1) to a desired or specifiable length.

5. The process as claimed in claim 2, further comprising the step of (f) cutting the laminated cable (1) to a desired or specifiable length.

6. The process as claimed in claim 3, further comprising the step of (f) cutting the laminated cable (1) to a desired or specifiable length.

7. The process as claimed in claim 1, further comprising the step of introducing the laminated cable (1) into the apparatus with respect to a desired position and a desired distance.

8. The process as claimed in claim 2, further comprising the step of introducing the laminated cable (1) into the apparatus with respect to a desired position and a desired distance.

9. The process as claimed in claim 3, further comprising the step of introducing the laminated cable (1) into the apparatus with respect to a desired position and a desired distance.

10. The process as claimed in claim 1, further comprising the step of aligning the at least one peeling tool (5) with respect to a desired position and a desired distance of the laminated cable, and automatically detecting the position of the laminated cable (1) with respect to the at least one peeling tool (5).

11. The process as claimed in claim 2, further comprising the step of aligning the at least two peeling tools (5) with respect to a desired position and a desired distance of the laminated cable, and automatically detecting the position of the laminated cable (1).

12. The process as claimed in claim 3, further comprising the step of aligning the plurality of peeling tools (5) with respect to a desired position and a desired distance of the laminated cable, and automatically detecting the position of the laminated cable (1) with respect to the plurality of peeling tools (5).

13. The process as claimed in claim 1, further comprising the steps of effecting the peeling off of a predetermined length and width of the window (7) by one of slight raising and lowering of the respective at least one peeling tool (5) and one of relative movement of the at least one peeling tool (5) along the laminated cable (1) or movement of the laminated cable (1) in the peeling direction relative to the at least one peeling tool (5) until one of a desired window length has been reached or resetting of the at least one peeling tool (5) is required.

14. The process as claimed in claim 2, further comprising the step of effecting the peeling off of a predetermined length and width of the window (7) by one of slight raising and lowering of the respective at least two peeling tools (5) and one of relative movement of the at least two peeling tools (5) along the laminated cable (1) or movement of the laminated cable (1) in the peeling direction relative to the at least two peeling tools (5) until one of a desired window length has been reached or resetting of the at least two peeling tools (5) is required.

15. The process as claimed in claim 3, further comprising the step of effecting the peeling off of a predetermined length and width of the window (7) by one of slight raising and lowering of the respective plurality of peeling tools (5) and one of relative movement of the plurality of peeling tools (5) along the laminated cable (1) or movement of the laminated cable (1) in the peeling direction relative to the plurality of peeling tools (5) until one of a desired window length has been reached or resetting of the required plurality of peeling tools (5) is required.

16. The process as claimed in claim 1, further comprising the step of effecting the peeling off of a predetermined length and width of the window (7) by effecting the peeling off of the window (7) by feeding of the laminated cable (1) by raising of a support below the at least one peeling tool (5) respectively coordinated and at least one of movement of the at least one peeling tool (5) and of the support along the laminated cable (1) or by movement of the laminated cable (1) in the peeling direction until one of a desired window length has been reached or at least until the support has been reset.

17. The process as claimed in claim 2, further comprising the step of effecting the peeling off of a predetermined length and width of the window (7) by raising of a support below the at least two peeling tools (5) respectively coordinated and movement of the at least two peeling tools (5) and of the support along the laminated cable (1) or movement of the laminated cable (1) in the peeling direction until one of a desired window length has been reached or at least until the support has been reset.

18. The process as claimed in claim 3, further comprising the step of effecting the peeling off of a predetermined length and width of the window (7) by raising of a support below the plurality of peeling tools (5) respectively coordinated and movement of the plurality of peeling tools (5) and of the support along the laminated cable (1) or movement of the laminated cable (1) in the peeling direction until one of a desired window length has been reached or at least until the support has been reset.

19. The process as claimed in claim 1, further comprising the step of effecting the separation of the chip (10), formed during peeling, after at least one of removal of the at least one peeling tool (5) from the insulation or lowering of the support and transporting of the laminated cable (1).

20. The process as claimed in claim 2, further comprising the step of effecting the separation of the chip (10), formed during peeling, after at least one of removal of the at least two peeling tools (5) from the insulation or lowering of the support and transporting of the laminated cable (1).

21. The process as claimed in claim 3, further comprising the step of effecting the separation of the chip (10), formed during peeling, after at least one of removal of the plurality of peeling tools (5) from the insulation or lowering of the support and transporting of the laminated cable (1).

22. The process as claimed in claim 1, further comprising the step of effecting the separation of the chip (10), formed during peeling, after at least one of further removal of the at least one peeling tool (5) from the insulation or lowering of the support and transporting of the laminated cable (1) to a chip breaker (9).

23. The process as claimed in claim 2, further comprising the step of effecting the separation of the chip (10), formed during peeling, after at least one of further removal of the at least two peeling tools (5) from the insulation or lowering of the support and transporting of the laminated cable (1) to a chip breaker (9).

24. The process as claimed in claim 3, further comprising the step of effecting the separation of the chip (10), formed during peeling, after at least one of further removal of the plurality of peeling tools (5) from the insulation or lowering of the support and transporting of the laminated cable (1) to a chip breaker (9).

25. The process as claimed in claim 1, further comprising the step of moving the at least one peeling tool (5) relative to the laminated cable (1) in at least two directions in order to produce the window by peeling the laminated cable (1).

26. The process for partially exposing conductor tracks in multiconductor laminated cables (1) as claimed in claim 1, further comprising at least one of the following steps: punching, cutting to length, slitting, marking, embossing of the laminated cable, cleaning of the exposed conductor tracks, testing of the exposed conductor tracks.

* * * * *